(12) United States Patent
Maguire et al.

(10) Patent No.: US 8,974,717 B2
(45) Date of Patent: Mar. 10, 2015

(54) METHOD FOR PRODUCING CERAMIC STEREOLITHOGRAPHY PARTS

(75) Inventors: Michael Christopher Maguire, Napa, CA (US); Michael Dean Baldwin, American Canyon, CA (US); Max Eric Schlienger, Napa, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 164 days.

(21) Appl. No.: 12/386,169

(22) Filed: Apr. 14, 2009

(65) Prior Publication Data

US 2009/0256284 A1    Oct. 15, 2009

Related U.S. Application Data

(60) Provisional application No. 61/124,044, filed on Apr. 14, 2008.

(51) Int. Cl.
  *B29C 35/04*   (2006.01)
  *B28B 1/00*   (2006.01)
  *C04B 35/626*   (2006.01)

(52) U.S. Cl.
  CPC . *B28B 1/00* (2013.01); *B28B 1/001* (2013.01); *C04B 35/6269* (2013.01); *C04B 2235/6026* (2013.01); *C04B 2235/665* (2013.01)
  USPC .......................................................... 264/401

(58) Field of Classification Search
  CPC .................................................. B20C 67/0051
  USPC ......................................... 264/308, 497, 401
  See application file for complete search history.

(56) References Cited

U.S. PATENT DOCUMENTS

| | | | |
|---|---|---|---|
| 4,945,032 A | 7/1990 | Murphy et al. | |
| 5,182,056 A | 1/1993 | Spence et al. | |
| 5,184,307 A * | 2/1993 | Hull et al. ..................... | 700/182 |
| 6,036,911 A | 3/2000 | Allison et al. | |
| 6,051,179 A | 4/2000 | Hagenau | |
| 6,117,612 A | 9/2000 | Halloran et al. | |
| 6,264,873 B1 | 7/2001 | Gigl et al. | |
| 6,267,919 B1 | 7/2001 | Tanaka et al. | |
| 6,366,825 B1 | 4/2002 | Smalley et al. | |

(Continued)

FOREIGN PATENT DOCUMENTS

EP        1 025 982 B1    7/2005
WO      WO 98/48993      11/1998

OTHER PUBLICATIONS

International Search Report and Written Opinion, PCT/US09/02320, Rolls-Royce Corporation, Jul. 23, 2009.

(Continued)

*Primary Examiner* — Larry Thrower
*Assistant Examiner* — Xue Liu
(74) *Attorney, Agent, or Firm* — Krieg DeVault LLP

(57) ABSTRACT

In addition to working curves, other equally important, but previously not understood, relationships exist for both the green strength and the cured line width of ceramic-loaded resins. These characteristics of cured parts are strongly affected by the dose rate, a parameter usually controlled with laser power. Multiple smaller doses are used to produce a total integrated dose. Multiple exposures benefit from using high power to produce a fast process. However, since the dose for a given layer is broken into several smaller doses, the negative effect of high power on strength and cured linewidth is reduced.

32 Claims, 3 Drawing Sheets

(56) References Cited

U.S. PATENT DOCUMENTS

| | | |
|---|---|---|
| 6,399,010 B1 | 6/2002 | Guertin et al. |
| 6,405,095 B1 | 6/2002 | Jang et al. |
| 6,600,965 B1 | 7/2003 | Hull et al. |
| 6,649,113 B1 | 11/2003 | Manners et al. |
| 6,699,424 B2 | 3/2004 | Nguyen et al. |
| 6,896,837 B2 | 5/2005 | Farnworth |
| 2001/0014403 A1 | 8/2001 | Brown et al. |
| 2005/0131570 A1 | 6/2005 | Jamalabad et al. |
| 2006/0119012 A1 | 6/2006 | Ruatta et al. |
| 2008/0063867 A1 | 3/2008 | Schlienger et al. |

OTHER PUBLICATIONS

International Preliminary Report on Patentability, PCT/US09/02320, Rolls-Royce Corporation, Oct. 19, 2010.

Supplementary European Search Report, EP 09 73 2098, Mar. 27, 2012.

\* cited by examiner

METHOD FOR PRODUCING CERAMIC STEREOLITHOGRAPHY PARTS

CROSS-REFERENCE TO RELATED APPLICATIONS

The present patent application claims the benefit of U.S. Patent Application No. 61/124,044, filed Apr. 14, 2008, which is incorporated herein by reference.

FIELD OF THE INVENTION

The present invention relates generally to a method for producing ceramic items utilizing ceramic stereolithography.

BACKGROUND OF THE INVENTION

The general field of ceramic stereolithography is believed known to those of ordinary skill in the art. More specifically, ceramic stereolithography utilizes a photo-polymerizable resin containing ceramic particles that solidifies when exposed to an appropriate energy dose. The present invention contemplates that the photo-polymerizable material including ceramic particles can be described in many ways including, but not limited to filled and loaded.

SUMMARY OF THE INVENTION

One embodiment of the present invention is a unique method for producing stereolithography parts. In one form, the parts are ceramic. In other forms, other materials may be used. Other embodiments include apparatuses, systems, devices, hardware, methods, and combinations for ceramic stereolithography parts. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE PREFERRED EMBODIMENTS

Figure 1:
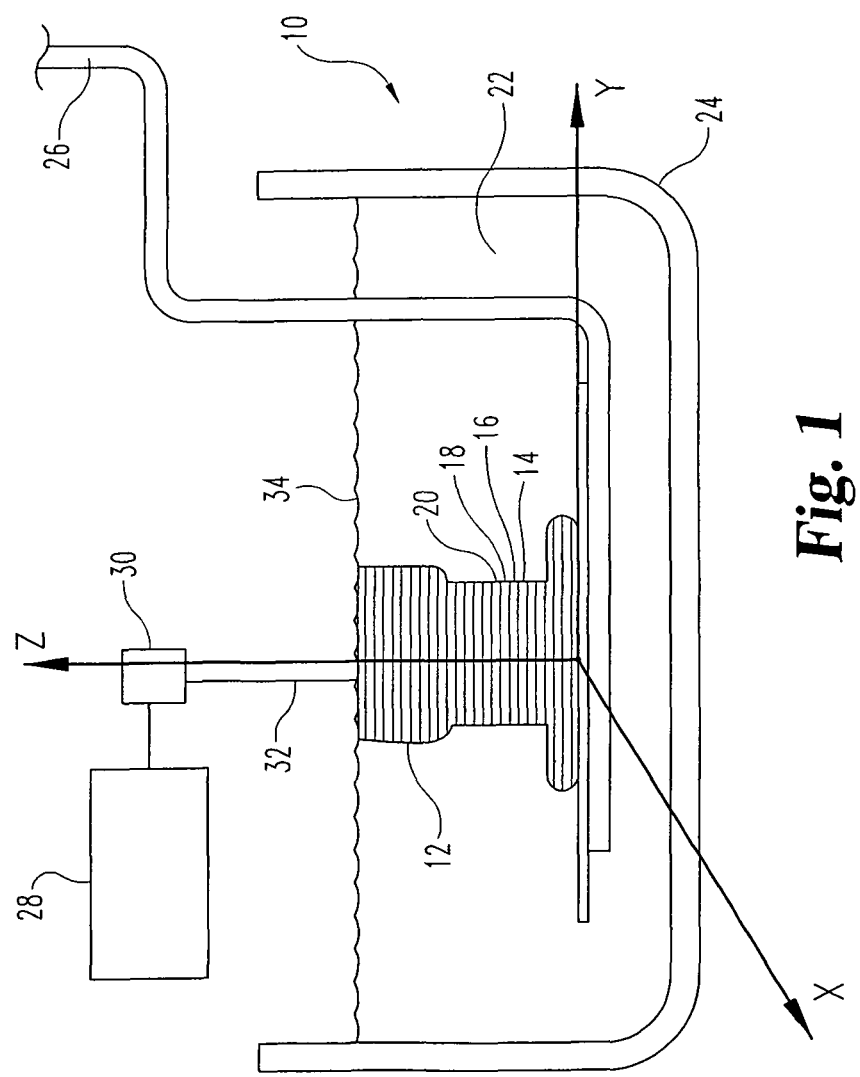
FIG. 1 is an illustrative view of one embodiment of a free form fabrication system for fabrication of component.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The proposed invention relates to a novel method using laser curing techniques with photocurable resins containing a dispersed ceramic constituent, referred to herein as loaded resins. These loaded resins are used to produce parts in a process that has been come to be known as ceramic stereolithography. Such parts include, but are not limited to, gas turbine engine components. The present invention produces the ability to improve the quality of parts built using ceramic stereolithography. The quality of parts improving so that for a fixed cure depth of the resin one or some combination of the following may result: (1) stronger parts can be built; (2) larger quantities of parts can be built on a platform; (3) parts with finer detail can be built; and, (4) build start-up is completely unattended.

Referring to FIG. 1, there is illustrated one non-limiting embodiment of a free form fabrication system 10 for free form fabrication of an of a ceramic component, such as a gas turbine engine component or a ceramic mold for casting a gas turbine engine component. In one form, system 10 is a selective laser activation (SLA) stereolithography system. Selective laser activation is based upon a stereolithography process that utilizes resins that solidify when exposed to an energy dose. In one form, the resin includes ceramic particles disposed within a photo-polymerizable monomer(s) and/or oligomer(s), and the energy dose is a polymerizing energy dose. The present application contemplates the utilization of an oligomer(s) resin alone or in combination with a monomer resin. While the present application will be generally described using a monomer it is equally applicable to an oligomer(s) resin alone or in combination with the monomer (s). In other embodiments, other materials may be disposed within a polymerizable monomer resin.

The energy dose used to cure the resin may be varied or otherwise controlled. In one form, the energy dose is controlled by fixing a laser power and beam diameter, and then controlling the laser scan speed (rate) across the resin surface. In one form the photocurable resin has at least one monomer that is polymerized by the energy dose to form a polymer binder. However, in another form, the photocurable resin has at least one oligomer that is polymerized by the energy dose to form a polymer binder. In one form, the energy dose is electromagnetic radiation output by a laser. In other embodiments, other energy sources maybe employed, e.g., UV sources. While the present application will be generally described with respect to an SLA stereolithography system, it is equally applicable to other free form fabrication systems, such as flash cure systems and other forms of scanned cure systems.

In one form, system 10 creates a three dimensional ceramic component 12. Component 12 is merely illustrative and is shown being formed in stereolithography system 10 by the photo-polymerization of a ceramic loaded resin into layers of ceramic particles that are held together by a polymer binder, e.g., including a layer 14, a layer 16, a layer 18 and a layer 20. In one form, each layer is on the order of 0.05 mm (0.002 inches) thick. Thinner or thicker layers may be employed in other embodiments. It should understand that there is no intention herein to limit the present application to any particular number of layers or thickness of layers. Although only a single component 12 is illustrated, it will be understood that a plurality of components 12 may be formed as a batch in system 10.

Stereolithography system 10 is illustrated in a simplified manner to facilitate the explanation of one method of making component 12. In one form, the formation of the layers (e.g. 14-20) utilizes a leveling technique to level each of the layers of the photo-polymerizable ceramic loaded resin prior to receiving the energy used to polymerize the resin. The present application contemplates the following techniques to level the resin: ultrasonic processing; time delay; and/or mechanically assisted sweep such a wiper blade. However, the present application also contemplates an embodiment that does not utilize active techniques for leveling each of the layers prior to receiving the polymerization energy.

System 10 may be used to create component 12 in the form of a three dimensional composite component. In one form, the ceramic component is transformed into a ceramic component with further processing, e.g., burnout and sintering. In another form, the green body produced by system 10 is the desired final form of component 12. In one form, the final component is less than 50% by volume ceramic. In other forms, the volume percentage of ceramic may be greater or lesser than 50%, e.g., depending upon the particular application.

A three dimensional coordinate system including a first axis, a second axis and a third axis is utilized as a spatial reference for the item being fabricated, e.g., ceramic component 12. In one form, the three dimensional coordinate system is a Cartesian coordinate system having X, Y and Z axes corresponding to the axes of stereolithography system 10. However, other three dimensional coordinate systems are contemplated herein, including but not limited to polar, cylindrical and spherical.

In one form stereolithography system 10 includes a resin containment reservoir 24, an elevation-changing member 26, a laser source 28 and a scanning device 30. Resin containment reservoir 24 is filled with a quantity of ceramic loaded resin 22 from which component 12 is fabricated. In one form, ceramic loaded resin 22 contains a photoinitiator. In another form, ceramic loaded resin 22 contains a dispersant in addition to the photoinitiator. Scanning device 30 scans a laser beam 32 from laser source 28 across the surface 34 of ceramic loaded resin 22 in the desired shape to form each layer of component 12.

Laser bean 32 is used to provide the energy dose to cure each layer of photocurable ceramic loaded resin 22 at and near the surface 34 of ceramic loaded resin 22. In one form, the scan rate of laser beam 32 and the intensity of laser beam 32 are parameters that affect the curing of the ceramic loaded resin 22. In another form, such as with a flash cure system 10, the laser scan speed and laser power are replaced with exposure time and lamp power. In yet another form, the parameters are lamp power and scan speed.

In one form, the scan rate is a fixed speed during the scanning of ceramic loaded resin 22. In other embodiments, the scan rate may be varied. An overcure of each layer binds the current layer to the previous layer. The successively formed cured layers ultimately form the three dimensional shape of ceramic component 12.

After the formation of ceramic component 12 in stereolithography system 10, ceramic component 12 may be subject to additional processing, such as burnout and sintering, prior to use. Ceramic component 12 is illustrated in FIG. 1 as being fabricated layer by layer in stereolithography system 10. The layers have a thickness in the direction of axis Z, which is referred to as the build direction. Ceramic component 12 is built at a build orientation angle as measured from axis Z. The build orientation angle illustrated in FIG. 1 is zero degrees. Other build orientation angles are fully contemplated herein. The three dimensional coordinate system is aligned with the build orientation angle. In one form the three dimensional coordinate system of ceramic component 12 and stereolithography system 10 coordinate system are coextensive.

In one form, the energy dose required to cure each layer of ceramic component 12 during the stereolithographic build of ceramic component 12 is provided in the form of a photon dose. The relationship between photon dose, (i.e. mJ/cm²) and cure depth has been well established. Resins used for stereolithography are typically characterized with two parameters that define how readily they are cured by laser exposure. These parameters, $D_p$ and $E_c$ are known as penetration depth and critical energy, respectively. The depth of cure, $C_d$, is then related to the energy via the well-established relationship:

$$C_d = D_p \ln(E/E_c) \qquad \text{Eq. 1}$$

Figure 2:
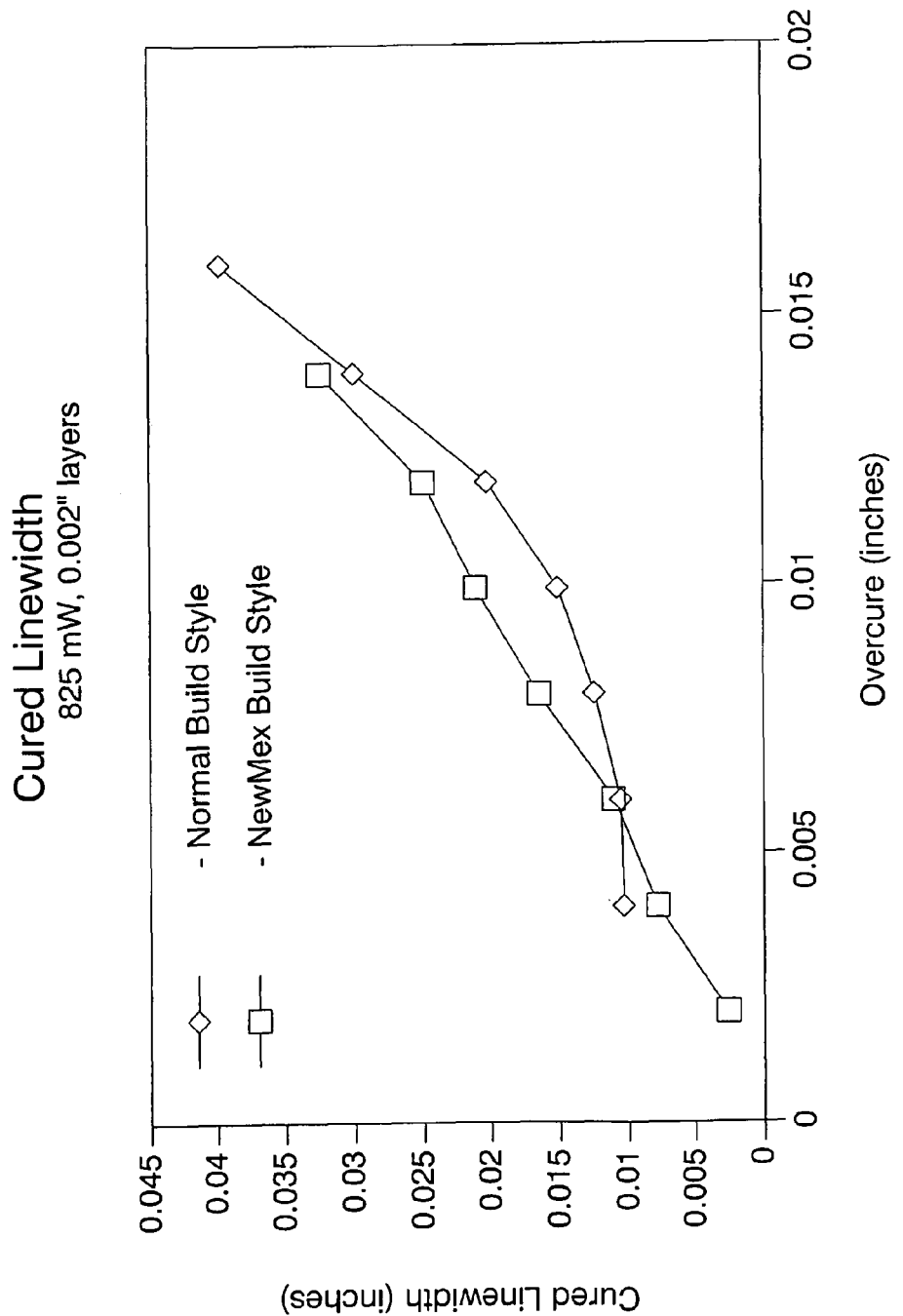
FIG. 2 illustrates a working curve of cure depth versus dose for three resins for use in ceramic stereolithography.

The relationship in Eq. 1 defines how the effective depth of cure varies with the laser energy deposited per unit area, E, also called the dose. In practice, the dose is typically varied by fixing a laser power and beam diameter, then varying the laser scan speed along the resin surface. To increase the dose, ceteris paribus, one would decrease the draw speed. When plotted in a log-log format, this relationship is called the "working curve" for a resin since it defines the energy dose required to cure to a given depth. The software that drives laser scanning systems in SLA machines requires knowledge of the resin working curve to determine draw speeds since several different cure depths and beam overlap methods are used during stereolithography. A typical working curve for a ceramic-loaded resin is shown in FIG. 2.

Working curves demonstrate that cure depth is primarily dependent on energy. While the laser power slightly affects the position of the working curve (usually through $E_c$, not $D_p$), this effect is slight. Hence, whether the dose is delivered by a high power laser operating at a high scan speed, or a low power laser traveling slowly, the cure depth in either case will be the same.

Figure 3:
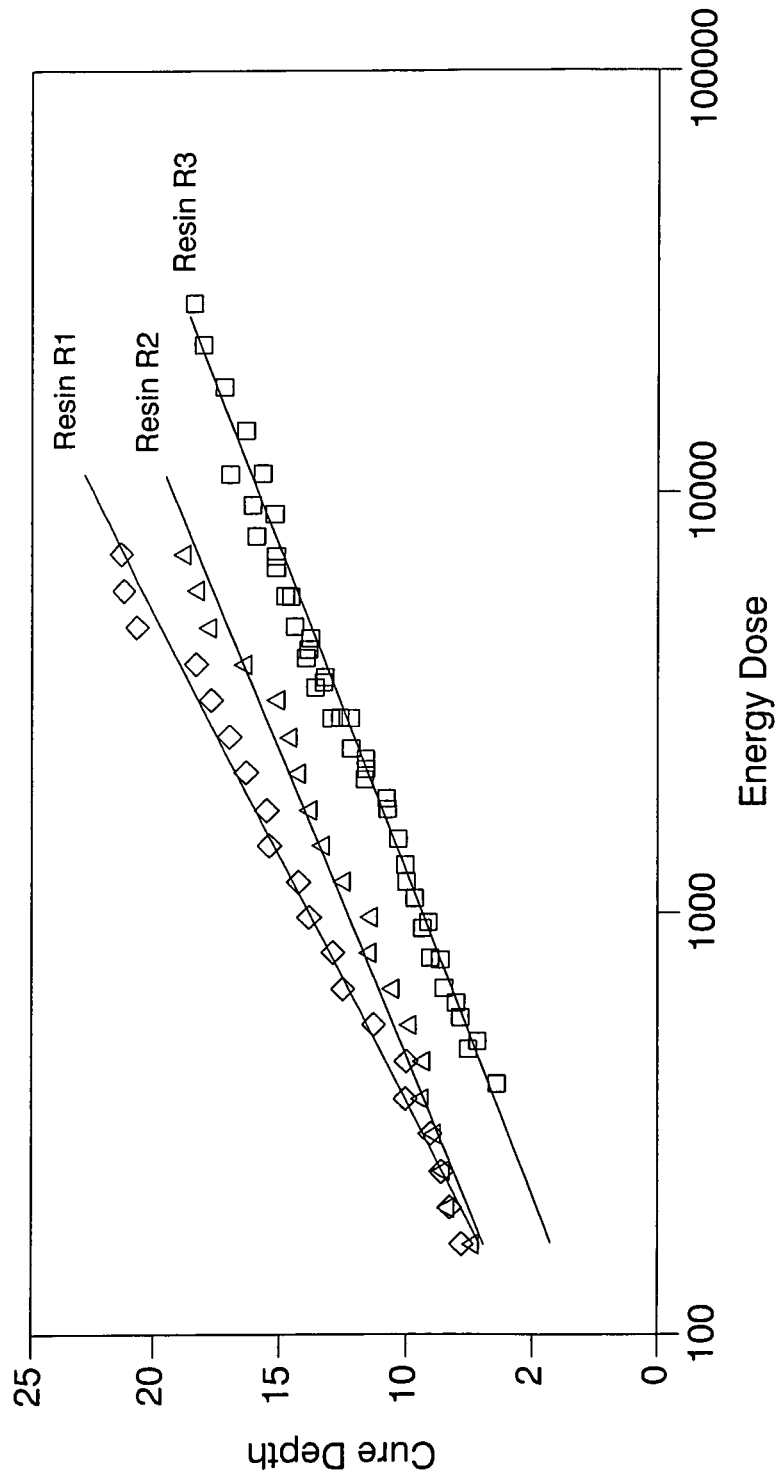
FIG. 3 illustrates the effect of multiple exposure build style on cured line width.

FIG. 3 shows three resins of varying sensitivity. Resin R3 would be considered the least sensitive, or "slowest" resin since it requires a higher dose to achieve a given cure depth when compared to the other two resins. Resin R1 is the "fastest" resin overall, but its speed is very similar to Resin R2 at lower cure depths.

Our research has shown that while the working curve is a necessary starting point to begin to exploit loaded resins for ceramic stereolithography, other temporally-controlled parameters have an effect on features such as the green cured strength, fired strength, and overall quality of parts produced. Temporally-controlled parameters may depend upon the type of system 10, and may include, in a nonlimiting example, scan speed, exposure time, dwell times, time between exposures and dose rate, which in one form is the rate at which the integrated dose approaches the desired total dose. Control and exploitation of these parameters provides the potential to improve the quality of the parts and/or the rate at which parts are produced. For example, some applications of the present invention might have the benefit of improving both the green and fired quality of parts, and to allow larger quantities of parts to be built per batch without sacrificing quality.

In addition to working curves, other equally important, but previously not understood, relationships exist for both the green strength and the cured line width of ceramic-loaded resins. These characteristics of cured parts are strongly affected by the dose rate, a parameter usually controlled with laser power. Characteristics affected by dose rate include, but are not limited to, strength, stiffness, layer adhesion, minimum feature size and surface finish. Our research has shown that: (1) higher sustained dose rates produce weaker green parts; (2) higher sustained dose rates produce broader cured line widths; and, (3) longer times between layer exposures produce weaker interlayer bonding resulting in green or fired part delaminations.

These effects compete with each other to produce sound parts. Since higher dose rates produce weaker parts, one would prefer to keep dose rates low (usually with low laser power). However, this can make build speed so slow as to be impractical. Similarly, if draw speeds are slow then the time between successive layers on large parts or multiple part builds becomes long and the interlayer bonding suffers. The interlayer (or successive layer) bonding strength has been shown to suffer as the time between drawing layers increases. As the interlayer draw time increases, parts exhibit higher occurrence of delaminations in the fired and green state. For a scanned cure system, as one attempts to build more parts in a given batch, this extends interlayer draw time by an integer amount equal to the number of parts in the batch. For example, if one neglects recoating times, if it takes 1 minute to draw a layer, then the time between exposures for each layer is one minute. However if 10 parts are then built in a batch although each part only requires 1 minute of draw time each, the time between laser exposure for a given part will be 10 minutes since each part sits idle waiting for the other parts to be drawn in each layer. Larger batch sizes show increasing delamination defects. For example, for a given part, a batch size of 12 parts showed no delamination defects, but for a build of 21 parts over 10 parts exhibited extensive delaminations. For flash cure systems, the number of parts on a platform may not be a problem, as exposure time does not change with the number of parts on the platform.

The present invention uses multiple smaller doses to produce a total integrated dose. In one form, the total integrated dose is considered as being the total photon energy per unit volume received by the resin. In another form, the total integrated dose includes photons that may be received by one or more previously exposed layers during the exposure of the current layer being exposed, e.g., the topmost layer. This New Multiple Exposure style, termed NewMex, benefits from using high power to produce a fast process, but that since the dose for a given layer is broken into several smaller doses, the negative effect of high power on strength and cured line width is reduced.

The effect of this multiple exposure build style on cured line width is shown in FIG. 2, which illustrates the normal build style (single exposure to reach overcure) and a multiple exposure to reach overcure. The data depicted in FIG. 2 is for a Resin having a layer thickness of 0.002 inches (0.05 mm) and a laser beam 32 of 825 mW. In one form, the cured line width is defined as the width of a green part produced by a single linear scan of a laser in a photocurable resin. This linewidth is typically larger than the laser beam diameter in some resins, such as ceramic loaded resins, due to scattering of the laser beam by the ceramic particles. Compared to a normal build style that uses only a single border, border prime, and hatch on each layer, the NewMex build style shown uses 4 border passes and 4 hatch passes at lower exposures per pass. The result is a more linear dependence of linewidth on overcure, and narrower linewidths at overcures less than 0.007 inch (the typical range used in ceramic stereolithography). Narrower linewidth impacts the ability to draw fine features. For example, narrower linewidths may yield cured line contours that are not achievable with wider linewidths.

Thus, in one form of the inventive build style, the energy dose required to cure a line (or other feature) on a particular layer is subdivided into a plurality of subdoses (exposures), e.g., photon subdoses. In another form of the inventive build style, the energy dose required for overcure is similarly subdivided. In either case, each subdose is, by itself, insufficient to cure the line (or other feature). The sum of the plurality of subdoses, on the other hand, yields a total integrated dose that is sufficient to cure (or overcure, depending on the embodiment) the line (or other feature). In one form, the total integrated dose pertains to the dose sufficient to cure (or overcure, depending on the embodiment) a feature on a given layer. In another form, the total integrated dose pertains to the dose sufficient to cure (or overcure, depending on the embodiment) an entire layer.

By using multiple exposures to cure each line, that is multiple energy subdoses, the width of the cured line, that is, the cured linewidth, is reduced relative to a cured line drawn by the same diameter beam but at a dose rate sufficient to cure the line in a single pass or exposure. It will be understood that the number of subdoses may vary with the intended application and desired results. The present invention is not limited to any particular number of subdoses used to form the total integrated dose.

By determining or otherwise having knowledge of the relationship between cure depth and cured linewidth for a single exposure cure of a resin versus multiple exposure cure of the resin, e.g., as shown in FIG. 2, a reduced cured linewidth may be obtained. For example, in one form, an overcure depth may be selected where the cured linewidth for a multiple exposure cure is less than the cured linewidth for a single exposure cure. At such a point, the multiple exposure cure provides a reduced cured linewidth relative to a single exposure cure. It will be noted that the present invention contemplates any number of multiple exposures.

Embodiments of the present invention may include defining a maximum interexposure period. The maximum interexposure period is the maximum amount of time allowed to pass between exposures of the ceramic loaded resin to achieve a particular ceramic component quality level. For example, in one form, the maximum interexposure period may be a time period that results in zero delamination defects in the batch produced by stereolithography system 10. In other embodiments, the maximum interexposure period may be some maximum acceptable number of delamination defects or other types of defects, e.g., resulting from weak interlayer bonding.

In one form, the maximum interexposure period pertains to the amount of time between exposures to polymerizing energy at a given location, without regard to whether the polymerizing energy is of a sufficient dose to cure or overcure the area so exposed. For example, in one form, the maximum exposure time may be an interlayer draw time, e.g., a time between interlayer passes with laser beam 32 at some scan rate of system 10, wherein a single exposure is used to cure the entire layer (or, in other embodiments, to cure each border line, hatch line, or other feature/location within the layer) and bond to the previous layer, e.g., overcure. In another form, the maximum interexposure period pertains to the amount of time between intralayer passes, such as where multiple exposures (e.g., one exposure per intralayer pass) are used to cure each entire layer (or, in other embodiments, to cure each border line, hatch line, or other feature/location within the layer) and bond to the previous layer, e.g., overcure. The maximum interexposure period may include a time margin to account for other activities or occurrences that take place between exposures, e.g., such as traverse time and recoating time.

In one form, a maximum number of components that can be scanned by stereolithography system 10 at a selected scan rate and within the maximum interexposure time is determined. This may allow each scanned location on a component 12 being formed in system 10 to receive each energy dose or subdose within the maximum interexposure time relative to the previous energy dose or subdose received at the same location in order to reduce or eliminate delamination defects in component 12.

In one form, the same laser beam wavelength is used in each subdose exposure. In other embodiments, different wavelengths may be used in different subdose exposures that may be combined to achieve the desired integrated energy dose. In one form, each subdose exposure is the same in magnitude, e.g., of intensity or delivered power per unit area. In other embodiments, different magnitudes, e.g., of intensity or delivered power per unit area, may be used for different exposures that may be combined to achieve the desired integrated energy dose. In one form, each subdose exposure reaches the same depth in the ceramic loaded resin. In other embodiments, each subdose exposure may reach a different depth in the ceramic loaded resin.

The strength of green parts built with this style is much improved over prior systems. The supports built with this style are stronger and more defined (linewidth effect) than with the typical single pass build style. An added benefit with supports built in this style is that the initial layers do not need any manual intervention to assist with drainage. In the normal build style, the holes in the build platform get clogged with a thin film of cured resin that clogs the hole. These holes are important for resin drainage. In order to break these films, operators must manually stop the build between layers, and pierce the film in each hole. This process takes additional time, requires attended operation, and is subject to error. With the NewMex style, the films do not form and the build starts and proceeds completely unattended.

In one form, multiple exposures may be employed to obtain different mechanical properties at different locations on the part. For example, higher doses may result in stronger, stiffer parts. Finer features for a given dose may be produced using multiple exposures. By using a multiple exposure build style, fine, strong features may be produced within a relatively softer part.

Embodiments of the present invention include a method of manufacturing a ceramic stereolithography gas turbine engine component. The method includes determining a maximum interexposure period; providing a ceramic loaded resin; performing a first exposure of a line in a first layer of the ceramic loaded resin; and performing a second exposure of the same the line in within the maximum interexposure period.

In a refinement of the method, the second exposure is of the same line in the first layer. In another refinement, the second exposure is of the same line in a second layer positioned above the first layer. In one form, the line is a border line. In another form, the line is a hatch line.

In another refinement, the first exposure and the second exposure are each individually insufficient to cure the line; and the first exposure and the second exposure combine to form an integrated energy dose sufficient to cure the line.

In a further refinement, the first exposure and the second exposure are performed to a same depth in the ceramic loaded resin. In another refinement, the first exposure and the second exposure are performed at the same intensity. In yet another refinement, the first exposure and the second exposure employ the same wavelength.

Another embodiment is a method of manufacturing a stereolithography component. The method includes determining a maximum interexposure period; determining an energy dose required to cure a layer in a ceramic loaded resin; subdividing the energy dose into a plurality of subdoses, each subdose being individually insufficient to cure the layer; initiating the provision of a first subdose to the layer; and initiating the provision of a subsequent subdose to the layer within the maximum interexposure period after the initiating provision the first subdose.

In a refinement of the method, the subdoses are equal in magnitude. In another refinement, the provision of the plurality of subdoses both cures the layer and bonds the layer to a previous layer. In yet another refinement, the energy dose is a photon dose, and the plurality of subdoses is a plurality of photon subdoses.

Yet another embodiment includes a method of manufacturing a stereolithography component using a stereolithography system. The method includes determining a maximum interexposure period; determining a scan rate of the stereolithography system; determining a maximum number of components which can be scanned by the stereolithography system at the scan rate and within the maximum interexposure period; and within the maximum interexposure period: completing a first scan of a ceramic loaded resin for a quantity of components no greater than the maximum number of components; and initiating a second scan of the ceramic loaded resin for the quantity of components.

In a refinement, the maximum interexposure period includes a time margin. In another refinement, the time margin is a recoating time margin. In yet another refinement, the first scan provides insufficient energy to cure the ceramic loaded resin. In still another refinement, one or more subsequent scans subsequent to the first scan are required in order to cure the ceramic loaded resin. In yet still another refinement, a point on a given component scan path receives energy from the first scan and from the second scan within the maximum interexposure period. In a further refinement, the ceramic loaded resin is formed of ceramic particles interspersed in a polymerizable monomer resin that contains at least one monomer.

Still another embodiment includes a method of reducing cured linewidth of a green part produced by stereolithography. The method includes determining a first relationship between an overcure depth and a cured linewidth for a single exposure cure; determining a second relationship between the overcure depth and the cured linewidth for a multiple exposure cure; selecting an overcure depth where the cured linewidth in the second relationship is less than the cured linewidth in the first relationship.

In a refinement, a number of exposures for the multiple exposure cure is selected to yield a substantially linear relationship between overcure depth and cured linewidth. In another refinement, the number of exposures for the multiple exposure cure is four. In yet another refinement, the overcure depth is less than about 0.007 inches.

Yet another embodiment of the present invention includes a method of manufacturing a component. The method includes building the component layer by layer via stereolithography using a photocurable resin containing a dispersed ceramic constituent and minimizing interlayer draw time by using multiple smaller doses to produce a total integrated dose necessary for a cure depth for the layer.

In a refinement, the total integrated dose is delivered using four border passes and four hatch passes. In another refinement, the building occurs without manual intervention during curing of layers representing a support for the component. In still another refinement, the building occurs completely unattended.

In a further refinement, n a fired strength of the component is improved relative to a single exposure cure. In a still further refinement, a green cured strength of the component is improved relative to a single exposure cure. In a yet still further refinement, the multiple smaller doses result in a build style having a more linear dependence of linewidth on overcure.

Still another embodiment includes a method of improving the quality of an apparatus manufactured using ceramic stereolithography by controlling curing of each layer based on a working curve of the resin and further based on other temporal parameters. In a refinement, at least one of the other temporal parameters includes controlling curing based on dose rate. In another refinement, at least one of the other temporal parameters includes controlling curing based on time between layer exposures. In still another refinement, the method includes controlling curing to minimize the time between layer exposures.

One embodiment of the present invention is a method of manufacturing a gas turbine engine component comprised of building the component layer by layer via stereolithography using a photocurable resin containing a dispersed ceramic constituent. Interlayer draw time is minimized while simultaneously using multiple smaller doses to produce a total integrated dose necessary for a cure depth for the layer.

In one refinement the total integrated dose is delivered using four border passes and four hatch passes. In another refinement the method further comprises using overcure linewidths in at least one layer of less than 0.007 inches. In another refinement the building occurs without manual intervention during curing of layers representing a support for the component.

In another refinement the building occurs completely unattended. A second embodiment of the present invention is a method of improving the quality of an apparatus manufactured using ceramic stereolithography comprising delivering a photon dose necessary for a cure depth of a loaded resin for a particular layer as multiple smaller doses. In one refinement the photon dose is delivered using four border passes and four hatch passes.

In another refinement the fired strength is improved. In another refinement the green cured strength is improved. In another refinement the multiple smaller doses selected result in a build style having a more linear dependence of linewidth on overcure. In another refinement the method further comprises using overcure linewidths in at least one layer of less than 0.007 inches. In another refinement the manufacturing using ceramic stereolithography occurs without manual intervention during curing of layers representing a support for the apparatus. In another refinement the manufacturing occurs completely unattended. In another refinement the method further comprises using overcure linewidths in at least one layer of less than 0.007 inches.

A third embodiment of the present invention is a method of improving the quality of an apparatus manufactured using ceramic stereolithography by controlling curing of each layer based on a working curve of the resin and further based on other temporal parameters. In one refinement at least one of the other temporal parameters include controlling curing based on dose rate. In another refinement at least one of the other temporal parameters include controlling curing based on time between layer exposures. In another refinement the method further comprises controlling curing to minimize the time between layer exposures. In another refinement the method further comprises using overcure linewidths in at least one layer of less than 0.007 inches. In another refinement the manufacturing using ceramic stereolithography occurs without manual intervention during curing of a plurality of layers representing a support for the apparatus. In another refinement the manufacturing occurs completely unattended.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

We claim:

1. A method of reducing cured linewidth of a green part produced by stereolithography, comprising:
   determining an energy dose required to produce an overcure depth for a single exposure cure operation;
   determining a cured linewidth for the single exposure cure operation;
   determining a cured linewidth for each of a plurality of different multiple exposure cure operations to produce the overcure depth, wherein multiple sub energy doses that are relatively smaller than the energy dose are provided by each multiple exposure cure operation to produce the overcure depth;
   selecting one of the multiple exposure cure operations where the cured linewidth is less than the cured linewidth in the single exposure cure operation; and
   using the selected multiple exposure cure operation to cure a photo-polymerizable resin to form the green part.

2. The method of claim 1, wherein the selected multiple exposure cure is selected to yield a substantially linear relationship between overcure depth and cured linewidth.

3. The method of claim 1, wherein the number of exposures for the selected multiple exposure cure is four.

4. The method of claim 1, wherein the overcure depth is less than about 0.007 inches.

5. The method of claim 1, further comprising:
   determining a time period for completing each of the multiple exposure cure operations; and
   selecting one of the multiple exposure cure operations with a time period that is less than a predetermined maximum time period.

6. A method for producing a part using stereolithography, comprising:
   determining an energy dose required to produce an overcure depth for a single exposure cure operation;
   determining a cured linewidth for the single exposure cure operation;
   determining a cured linewidth for each of a plurality of different multiple exposure cure operations to produce the overcure depth, wherein multiple sub energy doses that are relatively smaller than the energy dose are provided by each multiple exposure cure operation to produce the overcure depth;
   selecting one of the multiple exposure cure operations where the cured linewidth is less than the cured linewidth in the single exposure cure operation; and using the selected multiple exposure cure operation to cure a photo-polymerizable resin to form the part.

7. The method of claim 6, further comprising:
determining a time period for completing each of the multiple exposure cure operations; and
selecting one of the multiple exposure cure operations with a time period that is less than a predetermined maximum time period.

8. The method of claim 6, wherein the selected multiple exposure cure operation yields a substantially linear relationship between overcure depth and cured linewidth.

9. The method of claim 6, wherein the number of exposures for the selected multiple exposure cure operation is four.

10. The method of claim 6, wherein the overcure depth is less than about 0.007 inches.

11. A method of reducing cured linewidth of a green part produced by stereolithography, comprising:
determining an energy dose required to produce an overcure depth for a single exposure cure operation;
determining a cured linewidth for the single exposure cure operation;
determining a cured linewidth for each of a plurality of different multiple exposure cure operations to produce the overcure depth, wherein multiple sub energy doses that are relatively smaller than the energy dose are provided by each multiple exposure cure operation to produce the overcure depth;
determining a time period for completing each of the multiple exposure cure operations;
selecting one of the multiple exposure cure operations with a time period that is less than a predetermined maximum time period; and
using the selected multiple exposure cure operation to cure a photo-polymerizable resin to form the green part.

12. The method of claim 11, wherein the selected multiple exposure cure operation yields a substantially linear relationship between overcure depth and cured linewidth.

13. The method of claim 11, wherein the number of exposures for the selected multiple exposure cure operation is four.

14. The method of claim 11, wherein the overcure depth is less than about 0.007 inches.

15. A method for producing a part using stereolithography, comprising:
determining an energy dose required to produce an overcure depth for a single exposure cure operation;
determining a cured linewidth for the single exposure cure operation;
determining a cured linewidth for each of a plurality of different multiple exposure cure operations to produce the overcure depth, wherein multiple sub energy doses that are relatively smaller than the energy dose are provided by each multiple exposure cure operation to produce the overcure depth;
determining a time period for completing each of the multiple exposure cure operations;
selecting one of the multiple exposure cure operations with a time period that is less than a predetermined maximum time period; and
using the selected multiple exposure cure operation to cure a photo-polymerizable resin to form the part.

16. The method of claim 15, wherein the selected multiple exposure cure operation yields a substantially linear relationship between overcure depth and cured linewidth.

17. The method of claim 15, wherein the number of exposures for the selected multiple exposure cure operation is four.

18. The method of claim 15, wherein the overcure depth is less than about 0.007 inches.

19. A method of reducing cured linewidth of a green part produced by stereolithography, comprising:
determining an energy dose required to produce an overcure depth for a single exposure cure operation;
determining a cured linewidth for the single exposure cure operation;
determining a cured linewidth for each of a plurality of different multiple exposure cure operations to produce the overcure depth, wherein multiple sub energy doses that are relatively smaller than the energy dose are provided by each multiple exposure cure operation to produce the overcure depth; and
selecting one of the multiple exposure cure operations such that a first exposure of the multiple exposure cure operation provides insufficient energy to cure a line and a second exposure of the multiple exposure cure operation occurs within a maximum interexposure period.

20. The method of claim 19, wherein the maximum interexposure period is the maximum amount of time allowed to pass between exposures of a ceramic loaded resin.

21. The method of claim 20, wherein the maximum interexposure period is further defined by a quality level determined by a maximum number of allowable defects permitted in the green part.

22. The method of claim 19 further comprising:
curing a photo-polymerizable resin to form the green part with the selected multiple exposure cure operation.

23. The method of claim 19, wherein the selected multiple exposure cure operation yields a substantially linear relationship between overcure depth and cured linewidth.

24. The method of claim 19, wherein the number of exposures for the selected multiple exposure cure operation is four.

25. The method of claim 19, wherein the overcure depth is less than about 0.007 inches.

26. A method for producing a part using stereolithography, comprising:
determining an energy dose required to produce an overcure depth for a single exposure cure operation;
determining a cured linewidth for the single exposure cure operation;
determining a cured linewidth for each of a plurality of different multiple exposure cure operations to produce the overcure depth, wherein multiple sub energy doses that are relatively smaller than the energy dose are provided by each multiple exposure cure operation to produce the overcure depth; and
selecting one of the multiple exposure cure operations such that a first exposure of the multiple exposure cure operation provides insufficient energy to cure a line and a second exposure of the multiple exposure cure operation occurs within a maximum interexposure period.

27. The method of claim 26, wherein the maximum interexposure period is the maximum amount of time allowed to pass between exposures of a ceramic loaded resin.

28. The method of claim 27, wherein the maximum interexposure period is further defined by a quality level determined by a maximum number of allowable defects permitted in the part.

29. The method of claim 26 further comprising:
curing a photo-polymerizable resin to form the part with the selected multiple exposure cure operation.

30. The method of claim 26, wherein the selected multiple exposure cure operation yields a substantially linear relationship between overcure depth and cured linewidth.

31. The method of claim 26, wherein the number of exposures for the selected multiple exposure cure operation is four.

32. The method of claim 26, wherein the overcure depth is less than about 0.007 inches.

* * * * *